(12) United States Patent
Houston

(10) Patent No.: US 9,926,209 B2
(45) Date of Patent: *Mar. 27, 2018

(54) METHOD FOR ON-SITE AERIAL DISSEMINATION AND ATMOSPHERIC DISPOSAL OR "AEROSOLIZATION" OF THE WATER COMPONENT OF ALL LEACHATES AND WASTEWATERS

(71) Applicant: Kelly K. Houston, Cornelius, NC (US)

(72) Inventor: Kelly K. Houston, Cornelius, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,158

(22) Filed: Jun. 28, 2016

(65) Prior Publication Data

US 2016/0304357 A1 Oct. 20, 2016

Related U.S. Application Data

(63) Continuation-in-part of application No. 14/671,366, filed on Mar. 27, 2015, which is a continuation of application No. 14/519,163, filed on Oct. 21, 2014.

(Continued)

(51) Int. Cl.
*B01D 1/18* (2006.01)
*C02F 1/12* (2006.01)
(Continued)

(52) U.S. Cl.
CPC ................. *C02F 1/12* (2013.01); *B01D 1/18* (2013.01); *B05B 1/207* (2013.01); *B05B 7/0075* (2013.01); *B05B 7/0081* (2013.01); *B05B 7/30* (2013.01); *B05B 7/32* (2013.01); *B05B 13/005* (2013.01); *B05D 1/02* (2013.01); *B09B 1/004* (2013.01);
(Continued)

(58) Field of Classification Search
CPC .......... B05B 1/207; B05B 7/30; B05B 13/005
See application file for complete search history.

(56) References Cited

U.S. PATENT DOCUMENTS 3,979,061 A * 9/1976 Kircher ..................... F25C 3/04
239/14.2
4,597,524 A * 7/1986 Albertsson ................ F25C 3/04
239/14.2
(Continued)

*Primary Examiner* — Benjamin F Fiorello
(74) *Attorney, Agent, or Firm* — Coats & Bennett, PLLC

(57) ABSTRACT

A method for on-site aerial dissemination of Oxidatively Converted particles of contamination with substantial atmospheric disposal, commonly known as aerosolization, of the water component of all untreated or partially treated leachates and all untreated or partially treated wastewaters. These leachates and wastewaters (defined as water containing 2 or more detectable and known contaminants) are collected on site and the defined leachate or defined wastewater, having multiple defined and known contaminating suspended and perhaps precipitated solids therein, and aerially disseminating or aerially oxidizing or commonly known aerosolizing said contaminants over a chosen contaminant collections area (defined as 1-300 meters from the nozzles) and disposing of the water component of the leachate or wastewater through atmospheric disposal and lastly evaporation on the site of the leachate or wastewaters' generation. The commercial process can be known as "AerosoliZLD" leachate or wastewater disposal under the intent of Federal Zero Liquid Discharge (ZLD) regulations.

18 Claims, 4 Drawing Sheets

Related U.S. Application Data

(60) Provisional application No. 61/895,142, filed on Oct. 24, 2013.

(51) Int. Cl.

| | | |
|---|---|---|
| *C02F 1/52* | (2006.01) | |
| *C02F 1/74* | (2006.01) | |
| *B05B 1/20* | (2006.01) | |
| *B05B 7/00* | (2006.01) | |
| *B05B 7/30* | (2006.01) | |
| *B05B 7/32* | (2006.01) | |
| *B05B 13/00* | (2006.01) | |
| *B09B 1/00* | (2006.01) | |
| *B09C 1/00* | (2006.01) | |
| *B09C 1/08* | (2006.01) | |
| *B05D 1/02* | (2006.01) | |
| *C02F 103/00* | (2006.01) | |
| *C02F 103/22* | (2006.01) | |
| *C02F 103/10* | (2006.01) | |
| *C02F 103/26* | (2006.01) | |
| *C02F 103/06* | (2006.01) | |
| *C02F 103/34* | (2006.01) | |

(52) U.S. Cl.
CPC .............. *B09C 1/00* (2013.01); *B09C 1/08* (2013.01); *C02F 1/52* (2013.01); *C02F 1/74* (2013.01); *B09B 2220/00* (2013.01); *B09C 2101/00* (2013.01); *C02F 2103/001* (2013.01); *C02F 2103/06* (2013.01); *C02F 2103/10* (2013.01); *C02F 2103/22* (2013.01); *C02F 2103/26* (2013.01); *C02F 2103/34* (2013.01); *Y02W 30/32* (2015.05)

(56) References Cited

U.S. PATENT DOCUMENTS

| | | | | |
|---|---|---|---|---|
| 5,169,783 | A * | 12/1992 | Kieft | A01G 15/00 239/2.2 |
| 5,836,513 | A * | 11/1998 | Smith | F25C 3/04 239/14.2 |
| 6,378,778 | B1 * | 4/2002 | Luras | F25C 3/04 239/14.2 |
| 6,742,718 | B2 * | 6/2004 | Doebler | A01M 7/0003 239/147 |
| 2005/0084334 | A1 * | 4/2005 | Shi | B09B 1/004 405/129.9 |
| 2007/0186778 | A1 * | 8/2007 | Peterson | B01D 47/06 96/281 |
| 2010/0126340 | A1 * | 5/2010 | Peterson | A61L 9/14 95/32 |
| 2011/0232495 | A1 * | 9/2011 | Hutchinson | B01D 47/06 96/256 |

* cited by examiner

METHOD FOR ON-SITE AERIAL DISSEMINATION AND ATMOSPHERIC DISPOSAL OR "AEROSOLIZATION" OF THE WATER COMPONENT OF ALL LEACHATES AND WASTEWATERS

The present application is a continuation-in-part of U.S. patent application Ser. No. 14/671,366 filed Mar. 27, 2015 which is a continuation of U.S. patent application Ser. No. 14/519,163 filed Oct. 21, 2014, which claims priority to U.S. Provisional Patent Application Ser. No. 61/895,142 filed on Oct. 24, 2013. The present application claims priority under 35 U.S.C. § 119(e) to said U.S. provisional patent application and to the intervening applications set forth above. These applications are incorporated in its entirety by reference herein.

FIELD OF THE INVENTION

The present invention relates to onsite processes or methods for Aerially Disseminating the multitude of suspended and perhaps precipitated contaminating solids inherently found in all untreated or partially treated leachates and untreated or partially treated wastewaters and Atmospherically Disposing of the water component of all similarly defined leachates from sites regulated under the Resource Conservation and Recovery Act (RCRA) or commonly known as landfills and all other similarly regulated and defined multi-contaminant containing wastewater sites. The present invention also relates to methods or processes for Aerial Dissemination and Atmospherically Disposing of the water component of all aqueous solutions or Alternative Daily Cover (ADC) material through the same processes or method commonly known as "aerosolization." Atmospherically Converted or "aerosolized" methods or processes are defined and well known in the academic medical disciplines of Chemistry, Particle Physics and Fluid Dynamics and with application and with regard to military applications associated with chemical and biological weapons dispersion and dissemination and cannot be confused or associated with "atomization" or "misting" or the "evaporation" inventions of the past which draw their scientific processes and understanding and assumptions from the engineering professions.

BACKGROUND OF THE INVENTION

Resource Conservation and Recovery Act (RCRA) regulated sites or commonly defined "landfill" untreated or partially treated leachates are the percolation and runoff or multi-contaminate containing discharge that occurs from and within RCRA regulated sites and are usually considered more concentrated and thus more harmful than most other regulated and defined and multi-component wastewaters. Untreated leachate and all other types of untreated wastewater, is highly contaminated and typically includes large concentrations and several categories of dissolved and undissolved organic matter, inorganic matter, heavy metals and a host of other known and unknown but regulated contaminants. Leachate or all other similarly defined wastewaters are generally extremely regulated by federal, state and local governments and their constituent environmental agencies and citizen legal groups and its disposal methods require site specific permitting. These institutions have declared RCRA regulated sites producing leachate, and all other similarly defined wastewaters, to be a national threat to rivers, streams and soils, as well as municipal water supplies and ground water located in the general vicinity of RCRA regulated sites or all other regulated and defined wastewater generating sites. All regulated and defined wastewater handling and disposal procedures and methods nationally are moving toward the methods described in the Federal RCRA and Clean Water Act legislation. The described inventive process describes leachate as in its untreated or partially treated state and similarly all types of wastewater as in its untreated or partially treated state.

Offsite transportation, management, multi-treatment processes and final disposal of RCRA regulated site leachate and all other similarly defined or regulated wastewaters are expensive and inefficient. Typically RCRA regulated and defined leachates and all other similarly defined wastewaters are collected and may be transported off-site to a final treatment facility or are regulated under federal or state NPDES discharge permits or Land Application permits. RCRA regulated leachates and all other similarly defined wastewaters are typically collected in lined or unlined ponds or tanks and may be transferred to trucks that transport the defined leachate and all other similarly defined wastewaters to specially prepared leachate or wastewater treatment plants or simply discharged into the environment under very strictly industry and site specific but permitted conditions. It is the management, permitting, collection, transportation and final multi-treatment processes that make the presently understood engineering disposal methods extremely expensive and complicated. It is not unusual for a typical sized RCRA regulated site or all other similarly regulated and defined wastewater producing site, to spend more than $1 million dealing with the untreated leachate or all other similarly defined untreated wastewaters either on or off-site, annually. Aerial Dissemination and Atmospheric Disposal or Liquid-Water Particle Dispersion or Liquid-Water Particle Conversion or Atmospheric Discharge or Oxidatively Diffuse or Oxidatively Convert or Electrostatically Altered or Electrostatic Conversion or Oxidative Particle Release or Liquid Particle Release are just many different internationally known and generally accepted scientific and medical descriptions of the "aerosolization process" found in scientific literature and are associated with this invented method or processes for intentionally concentrating the multitude of contaminants through intentional additional aerial oxidation and their intentional dissemination and electrostatic charge increases so as to further clump contaminants which "fall out" of water suspension and are intentionally delivered to a defined and known contaminant collections area, which is defined as 1-300 meters from the nozzles, and thus liberate the water as vapor into the atmosphere finally through known evaporation processes. The above scientific terms are used to describe "the aerosolization process" in the medical and military professions that make up those skilled in the long known international sciences and art. The combined academic disciplines of: Chemistry, Particle Physics and Fluid Dynamics form the basis of understanding and testing that has produced Aerosolization. The "aerosolization process" associated with this invention is the intentional addition of airborne produced oxidation to the inherently and naturally clumped large and heavy and irregularly shaped contaminants found in all untreated leachates and wastewaters which inherently enhances the present process of waterborne oxidation (H2O) found when contaminants are contained in water. This additional airborne oxidation adds additional size and weight and produces additional very irregular contaminant containing particle shapes, which are not aerodynamic in the untreated and naturally clumped particles of contamination contained in water. The electrostatic charge between the now further airborne oxidized clumps of contaminants now dramatically increases the individual electrostatic charges of these clumped particles and further clumps, like a magnet, the contaminants thus adding additional size and weight and creating additional irregular shapes of clumped contaminants. These clumps of contaminants are now pulled by gravity out of the water and "fall out" of water suspension and break water droplet containment, which then finally starts the known evaporation process.

SUMMARY OF THE INVENTION

In one embodiment, the present invention relates to a method or process for onsite "aerosolization" of RCRA defined untreated or prepared leachates and all other similarly defined and regulated multi-component wastewaters. In one embodiment of the present invention, RCRA regulated and defined yet untreated or unprepared leachates are directed to a high output air/water system and a set of adjustable and interchangeable nozzles specifically designed and constructed to maximize oxidation. The defined leachates, or all other similarly defined wastewaters, are pumped untreated or somewhat treated but under some pressure past the nozzles and the nozzles initiate a Liquid-Water Particle Dispersion process of the defined leachate or similarly defined wastewater into the path of the system's high output air flow. This Liquid-Water Particle Conversion process, well know in the medical and military applications commonly known as "aerosolization." forms a controllable mixture of air-defined leachate or air-defined wastewater that can be aerially disseminated into a known and specifically purposed collection area (defined as 1-300 meters from the nozzles) and atmospherically dispose of the water component of the defined leachate or similarly defined wastewater on the site where the defined leachate or all other similarly defined wastewaters were generated. The formed conduit with formed pipe containing nozzles specifically designed to maximize oxidation, aerially disseminate suspended and perhaps precipitated contaminating solids over the designated and defined or permitted collection area. Much of either mixture (leachate or wastewater) now contains "clumped" or "oxidized" or "electrostatically altered" contaminants and a larger portion can be defined as an Atmospheric Discharge or "Aerosol" as water vapor post inventive process or method. However, the air-defined leachate mixture or air-defined wastewater mixture includes the contaminating suspended and/or precipitated solids inherently found in all untreated leachates and multi-component untreated wastewaters and their "elements or compounds of concern" now Oxidatively Diffuse or Oxidatively Convert or Electrostatically Alter or "aerosolize" during this natural aerial oxidation process and form additional clumps of contaminants which add size and weight and very irregular and unaerodynamic shapes. Typically, in the case of a RCRA regulated site or other generally defined wastewater aerosolization application, for example, the multitude of contaminating suspended and perhaps precipitated solids or other elements or compounds of concern, which Oxidatively Diffuse or Oxidatively Convert these clumped particles of contamination onto the surface of a RCRA regulated or other wastewater producing site surface, or unlined designated or defined or permitted area may additionally promote the growth of vegetation. Additionally, this same "aerosolization process" can disseminate intentionally added beneficial aqueous solutions or an Alternative Daily Cover (ADC) materials or solutions to a defined and desired location on the same site that generated the defined leachate or wastewater while still Atmospherically Disposing of the water component of the defined leachate or similarly defined wastewater.

In another particular embodiment, all defined wastewaters which are inherently and initially contained in a permitted unlined or lined contaminant containment area or lagoon are directly pumped or directed to a formed conduit with formed pipe containing nozzles specifically spaced and designed and constructed to maximize oxidation. The defined wastewater is pumped under some pressure through the conduit with formed pipe containing nozzles for onsite aerial dissemination of the naturally clumped contaminants through the oxidation process found in the interaction of water and air and contaminants which greatly increases the electrostatic charge associated with each particle further clumping the particles beyond their naturally clumped state. The Atmospheric Conversion of these now further clumped particles of contamination found in the "waste component" of the wastewater are now initially separated into a "waste component" and "water component." The specially designed and constructed nozzles emit an aerial dissemination or atmospheric conversion or "aerosol" that is naturally clumped, further oxygenated and electrostatically charged for further clumping and accelerated with the formed conduit with formed pipe which contains nozzles airflow, which forms an air-defined wastewater mixture. The formed conduit with formed pipe which contains nozzles can be mobile and thus very intentionally positioned and directed to intentionally propel the mixture of air-defined wastewater over the defined unlined or lined catch basin, lagoon, for example, where a substantial portion of the regulated and defined contaminants found in the suspended or precipitated solids in the defined wastewater is aerially disseminated into a regulated and defined or permitted area and is now separated from the water component of the defined leachate or all other defined wastewater and is released as water vapor into the atmosphere while contaminating solids, elements and compounds of concern contained in the wastewater Oxidatively Diffuse and further clump in the "waste component" of the defined leachate or defined wastewater and intentionally "fallout" of waterborne suspension into the unlined or lined catch basin, lagoon or other regulated or defined or permitted collection area. The commercial process can be known as "AerosoliZLD" defined leachate or defined wastewater final disposal under the intent of the Federal "Zero Liquid Discharge" or (ZLD) regulations found in the Federal "Effluent Limitation Guidelines" or (ELG).

The aerial dissemination of the waste component and atmospherically disposed water component is such that a substantial portion of the defined leachate or defined wastewater becomes a "Aerosol" and the contaminating suspended or perhaps precipitated solids, elements or compounds of concern contained in the defined leachate or defined wastewater necessarily further dump and fall onto a designated or a specific area such as an unlined or lined catch basin, lagoon or designated and permitted area. A "fine mist" or "vaporization" or "evaporation" or "atomization" is not characterized by this invention and any past inventions using such terms do not explain this process or method as large, heavy, irregularly shaped and dumped particles are intentionally formed at the nozzles through oxidation and increased electrostatic charges so that they can be intentionally delivered to a defined clumped contaminant collections area. Also the distance between the clumps containing the contaminants and carried in water is thus greatly decreased and fused and does not require specific ambient atmospheric conditions. Aerial dissemination and water component atmospheric disposal or commonly known as "aerosolization" is the opposite of any mechanical atomization process but rather a medical term as understood by international military testing and applications and their associated medical academic and practical applications associated with offensive aerial chemical and biological agent dissemination into a known and defined area of operations. Aerosolized particles issuing from the nozzles and for several meters from the nozzles would physically measure in the thousands and hundreds of microns as delivered into the defined contaminate collection area. This invented and intentionally created condition is required for intentional and substantial control of the regulated contaminants found in the defined leachate and defined wastewater on generating sites to maintain strictly permitted operation. The medical and military common term of "aerosolization" is intentionally chosen to describe this invention of defined on-site leachate or similarly defined wastewater aerial dissemination and considerable water component atmospheric disposal.

Other objects and advantages of the present invention will become apparent and obvious from a study of the following description and the accompanying drawings, which are merely illustrative of such invention.

DESCRIPTION OF EXEMPLARY EMBODIMENTS

Figure 1:
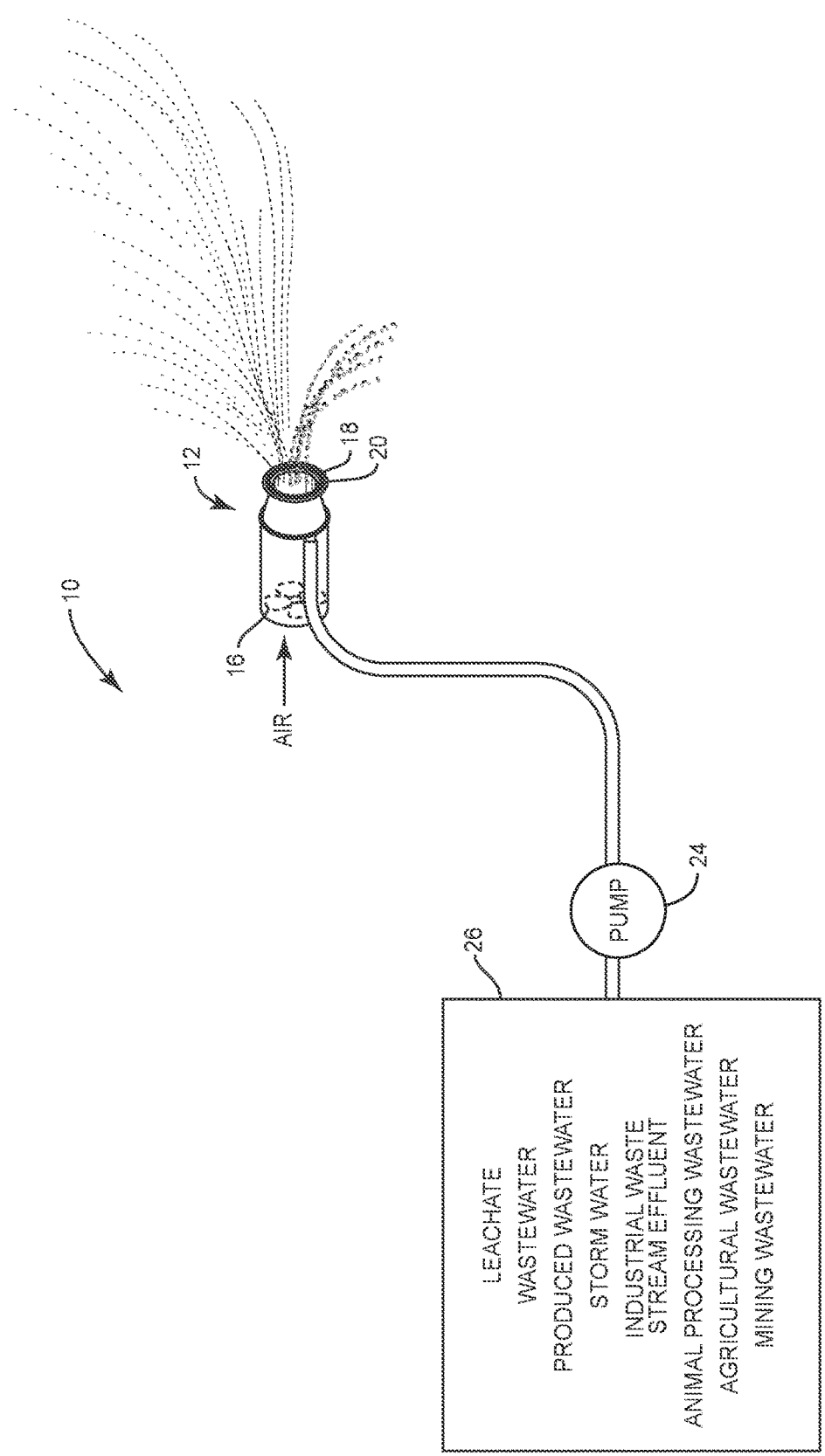
FIG. 1 is a schematic illustration for a system for aerially disseminating and atmospherically discharging water as vapor also commonly known as "aerosolizing" a defined wastewater 26 using a pump or series of pumps 24, such as on RCRA regulated or all other similarly defined wastewater site, onsite and with a driven fan 16 with formed conduit 12 with formed pipe 20 containing nozzles 18 which are specially designed and spaced and constructed to maximize aerial oxidation of the specific constituents found in a site specific defined leachate or defined wastewater. The nozzles will widely vary in configuration, design and construction and in the chosen materials used due to the extremely wide variety of industry and site-specific contaminants, required flow rates and permit limitations and would be chosen by persons of ordinary skill and with the specific understanding of the above limitations.

With further reference to the drawings, FIG. 1 shows a process or method for aerially disseminating 70 and atmospherically disposing of the water component 80 as vapor or "aerosolizing" the naturally occurring clumped particles of contamination found in defined leachates or similarly defined wastewaters. This natural chemical and biological clumping inherently found in contained defined leachate or similarly defined wastewater is further enhanced by waterborne oxidation as found in the inherent oxygen component of (H2O). The inherent multitude of contaminants as contained in the defined leachate or defined wastewater naturally clump where they are collected and further oxidize in the water and grow larger and heavier in the defined leachate or defined wastewater containment area usually tanks or lined or unlined ponds or lagoons, and is enhanced by temperature, pH and variations other environmental conditions. With the addition of the driven airstream to the naturally clumped and environmentally altered contaminants, which are now further clumped and further growing in size and weight by the waterborne oxidation process from just being contained within water, the now additionally airborne oxidatively converted or "clumped" contaminants add additional weight and size as well as form new irregular shapes as they are aerially oxidized and these clumps of contaminants, which are not aerodynamic and thus cannot be propelled very far in the airstream from the nozzles 70 initiate the "fall out" process. This process is also commonly known as the process of "aerosolization" as found in the medical and pharmaceutical professions in nebulizers or nasal sprays which are intentionally created to deliver relatively large particles of medicine, which is suspended in a water like solution, a short but to a known or desired distance and to desired location in the body (nose, throat, or lungs as an examples). This medical and military term of "aerosolization" is also used to describe the process of aerially disseminating a chemical or biological agent, which in the distant past, was carried or delivered in a water-like solution, to a particular and desired location some distance from the nozzles. The naturally occurring processes of chemical and biological clumping, enhanced by the waterborne oxidation process found in suspending the agents in water (H2O) combined with the additional particle size and weight and new irregular shaped particles found in the oxidation inherent in airborne oxidation of the agent solution was further complicated by the triple clumped very heavy and large and irregularly shaped particles now having their individual electrostatic charges greatly increased which further clumped the particles, like a magnet, thus adding considerable additional size and weight and creating additional irregular shapes which cannot travel very far from the nozzles for practical and desired reasons so as to be in compliance with industry and site specific permitted operational conditions. These beneficial uses of medical profession particle "aerosolization" and the military hurdles found in the attempted "weaponization" of waterborne chemical and biological agent dissemination or "aerosolization" forms the scientific basis for this inventive process or method. As will become apparent from the present disclosure, system 12 is used for aerially disseminating 70 and atmospherically disposing or "aerosolizing" the water component 80 as water vapor of all defined and regulated wastewaters such as: produced water, animal processing water, Agricultural wastewater, leachate, industrial waste stream effluent, stormwater, mining wastewater, "Freeboard" or all other types of regulated and defined multi-component wastewaters, while intentionally clumping the multitude of contaminants and delivering them to a known and permitted and defined collection area 70. As will be appreciated from subsequent portions of the disclosure, defined wastewaters or defined leachates are being Aerially Disseminated or Oxidatively Diffused or Electrostatically Altered or as is commonly known to medical and military professionals as the multi-step process of "aerosolizing" 70 and 80 and is directed under some pressure into the formed pipe 20 and from the formed pipe the defined wastewater or defined leachate is aerosolized inwardly and outwardly from the contained series of defined nozzles 18. As seen in FIG. 1, the nozzles are very intentionally oriented about an outlet end portion of the formed conduit 12 to maximize aerial oxidation. Further, the defined nozzles 18 are directed inwardly and outwardly as to optimize the Atmospheric Discharge or Oxidatively Diffused or Electrostatically Altered 70 or "aerosolization" process for all defined leachates or defined wastewaters and is directed inwardly and outwardly towards the center of the conduit 12. As discussed later herein, the Aerial Particle Converted or "aerosolized" defined leachate or defined wastewater mixes with the system of air passing through the conduit 12 to form an air-defined leachate or defined wastewater mixture also known as the "airborne aerosolization process." In one embodiment, as discussed below, the defined wastewater is a RCRA regulated and defined leachate multi-component contaminated solution that is produced by a commonly known "landfill" which maybe lined or unlined. This regulated and defined leachate contains multi-component contaminants of suspended and perhaps precipitated solid solution and is aerosolized or Aerially Disseminated 70 by the defined nozzles 18 and injected into the stream of air passing through the formed conduit 12 and Oxidatively Diffusing or clumping the defined contaminating suspended and precipitated contaminating solids 70. Pumping 24 the defined wastewater or defined leachate to the formed conduit 12 and formed pipe 20 and to the inwardly and outwardly disposed nozzles 18 which are spaced and designed and constructed in such a way as to maximize the oxidation process between air and defined wastewater or defined leachate mixing close to the nozzles 18. The particles or clumps of further aerially oxidized contamination are now very large and very heavy and irregularly shaped and now have their electrostatic charges greatly increased due to the additional aerial oxidation and now even further clump or fuse, grown even larger and heavier and have new irregular shapes 70 thus not being able to travel very far from the defined nozzles 18. These clumps are for a short period of time additionally still contained in the transporting water and as they travel farther from the defined nozzles 18 gravity will now start pulling these now very large and heavy and fused through electrostatic charge increased clumps of contamination out of the water component of the defined wastewater or defined leachate and cause them to "fall out" or be "pulled out" of suspension 70. This aerosolization process is well known in chemical agent and biological agent or radiological isotope "fall out" as is understood in military descriptions and applications. As can be seen in the aerosolization process shown in FIG. 1, the heavier clumps of contamination "fall out" of suspension into a known collection area 70 and the water component of the defined and regulated wastewater or leachate starts the evaporation process 80. The end result will be that the defined wastewater or defined leachate will be "dewatered" with the oxidized and electrostatically fused clumps of contamination "falling out" or being "pulled out" by gravity into a known and chosen "contaminant collection area" defined as somewhere between 1-300 meters from the nozzles and the water component of the defined leachate or defined wastewater liberated as water vapor through known evaporative processes 80.

Figure 2:
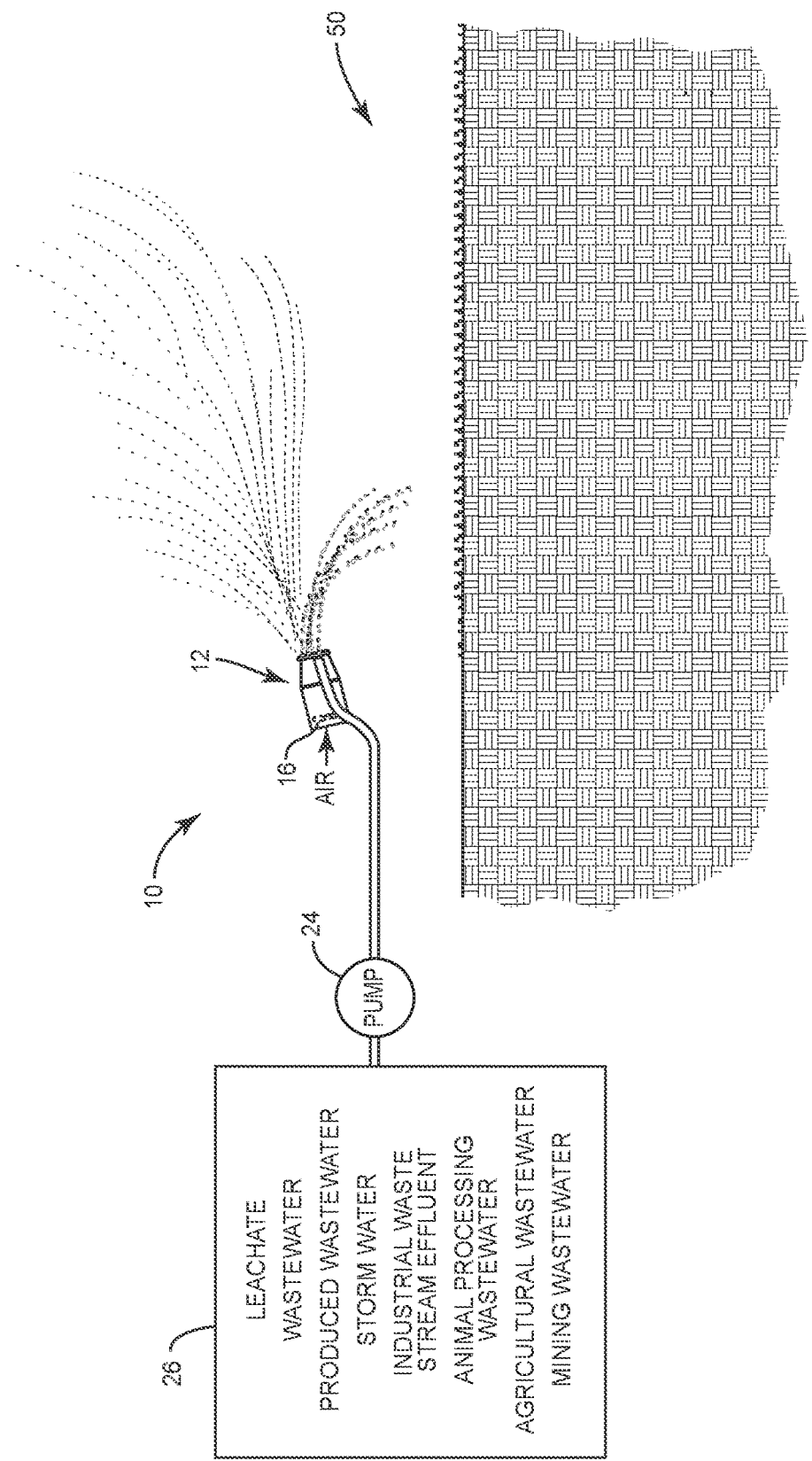
FIG. 2 is a schematic illustration of a RCRA regulated site 50 such as a lined or unlined landfill containing defined leachate or a similarly defined wastewater producing site illustrating the basic process of pumping 24 the defined leachate or similarly defined wastewater 26 and then utilizing a driven fan 16 with formed conduit 12 with formed pipe 20 containing defined nozzles 18 to aerially disseminate or aerosolize a portion of the defined leachate or similarly defined wastewater 26 while at the same time permitting the defined leachate or similarly defined wastewater containing a multitude of contaminating suspended and precipitated solids contained in the defined leachate or similarly defined wastewater to Oxidatively Diffuse or undergo Liquid Particle Conversion or Aerially Disseminate or "Aerosolize" the defined leachate or similarly defined wastewater over a chosen collections area defined as between 1-300 meters from the nozzles and which defined collection area may also be lined so as to capture the delivered clumped contaminants or unlined so as to beneficially use the clumped particles 70.

Also forming a part of the process or method is one or more pumps 24 and driven power sources to the driven fan, which are external to this invention. The function of the one or more pumps 24 is to pump the defined wastewater or defined leachate under some pressure into the formed ring 20 and out the defined nozzles 18. In addition, the overall system will include, in some embodiments, a storage or defined collection area, which can be lined or unlined, for holding or capturing the defined wastewater defined leachate clumped or oxidized or electrostatically altered or fused contaminants 70. The defined or permitted holding or capturing area is shown in FIG. 2 as under 70 but is not necessitated to be on a RCRA regulated site as shown by 50 and can be lined or unlined.

FIG. 1 shows the formed conduit 12, as well as the formed pipe 20 with defined nozzles 18, disposed around the outlet end of the conduit in one possible embodiment shape 12. As discussed above, the defined leachate or defined wastewater is injected into the air stream forms an air-defined leachate or air-defined wastewater mixture. The air functions at least partially as a carrier and partially as the Oxidative Diffusion method for the Aerially Disseminated or Electrostatically Altered or "aerosolized" leachate or wastewater. In addition, because of the velocity and energy associated with the moving stream of air that is being propelled from the outlet end of the conduit end 12, the system of air facilitates the further Liquid Particle Conversion or Oxidative Particle Release or Electrostatic Conversion or commonly known as "aerosolization" of the leachate or wastewater 70 and 80. The formed conduit 12 with formed pipe 20 containing nozzles 18 can be designed to propel the air-defined leachate or air-defined wastewater mixture a substantial distance from the outlet end, but it is not necessary. Typically, but not always, the formed conduit 12 with formed pipe 20 containing defined nozzles 18 are mounted on a mobile platform such that it can be moved from point to point. Further, the formed conduit with formed pipe containing defined nozzles is typically adjustably mounted on the platform. Around the platform and also can be rotated up and down such that the entire assembly can effectively direct a stream of air including the Aerially Disseminated or aerosolized defined leachate or defined wastewater a substantial distance from the outlet end of the conduit 12. Thus, with the numerous adjustment features associated with the formed conduit 12 with formed pipe 20 containing defined nozzles 18, the assembly can be aimed and directed in an infinite number of directions.

Various types of existing formed conduits 12 with formed pipes 20 containing some nozzles 18 can be utilized to Aerially Disseminate and Atmospherically Dispose or "aerosolize" the water component of all defined leachates and defined wastewaters on the site where these contaminating liquids were generated. For example, some forms of machines purposed for snow blowing or dust suppression or odor solution dissemination machines, or some custom built machines can be utilized to aerially disseminate or aerosolize a defined leachate or defined wastewater.

The defined wastewater or defined leachate solution typically includes many contaminating suspended solids and in some cases precipitated solids. That is, the regulated and defined wastewater or defined leachate solution may include dissolved solids, that through some possible chemical processes prior to reaching the formed conduit with formed pipe containing nozzles causes the dissolved solids to precipitate. Filtering or pre-conditioning or treating or pre-preparing the regulated and defined wastewater or leachate solution is not necessary for aerial dissemination 70, commonly known as aerosolization, and should not be associated with atomization or evaporation or misting processes or inventions. Aerosolization and Atomization are opposite scientific methods or principles in there, intent, purpose, use, equipment, measurement, testing equipment and testing parameters. Past atomization methods or processes or invented machines would measure specially prepared or optimally environmentally conditioned settings might measure their particle size in the 1-20 microns range at the nozzles. The aerosolization process would necessarily and intentionally produce clumps of contamination measuring in the thousands and hundreds of microns at the nozzles which is inherently necessary so as to be in compliance with industry and site specific operationally permitted conditions. Thus, in some cases, the regulated and defined wastewater or regulated and defined leachate solution includes both suspended solids and precipitants in their natural clumped state and would necessarily be aerosolized in very high volumes and with very high flow rates which is opposite in all measurable considerations from past atomization or misting or evaporation inventions used in treated leachate or treated wastewater "treatment" processes. The present invention is a dissemination and disposal method and not a "treatment" method or process which necessitates additional "treatment" before final disposal in either an on site or off site treatment facility or NPDES discharge permit or Land Application permit as discussed above. The basic approach for aerially disseminating or atmospherically converting or oxidatively diffusing or electrostatically altering or commonly known as "aerosolizing" the regulated and defined wastewater or defined leachate is to directly pump 24 the air-untreated or partially treated wastewater or air-untreated or partially treated leachate mixture from the outlet end of the conduit 12 such that the aqueous or water portion of the wastewater or leachate solution aerially disseminates or aerosolizes into the atmosphere 80. At the same time, the object is to permit the regulated and defined contaminating suspended or precipitated solids inherent in the wastewater or leachate solution to Oxidatively Diffuse out of the air-wastewater stream onto a regulated and defined and pre-selected unlined or lined area so as to be in compliance with existing federal, state and local laws, regulations and court opinions 70. As will be discussed later, in the case of aerially disseminating 70 and atmospherically disposing of the water component 80 of defined leachate from a RCRA defined landfill or all other regulated and defined wastewaters on the site of generation, it may be desirable to position the formed conduit 12 with formed pipe 20 containing defined nozzles 12 such that inherent yet helpful solid minerals in the form of nitrogen, calcium or phosphorous compounds, for example, will aerially disseminate 70 or aerosolize onto an area such that they may promote the growth of vegetation which is also regulated on these defined sites as seen in FIG. 2 or in FIG. 4. 70 and additionally in 40.

Turning to FIG. 2, shown therein is a particular application of the present invention. In this case, the formed conduit 12 with formed pipe 20 containing defined nozzles 12 is utilized to aerially disseminate 70 and atmospherically dispose 80 of the water component of defined leachate produced by a RCRA regulated and defined site commonly known as a lined or unlined landfill indicated generally by the numeral 50. Before describing the process in more detail, it may be beneficial to briefly discuss the RCRA regulated and defined site commonly known as a lined or unlined landfill site 50. The structure of a RCRA regulated and defined site or landfill can vary from location to location but may have a regulated, defined and or permitted leachate holding area, the leachate solution can be Aerially Disseminated or Oxidatively Diffused or Electrostatically Altered 70 or "aerosolized" such that the water component is atmospherically discharged or disposed of 80 continuously or periodically. In order to aerially disseminate 70 and atmospherically discharge or dispose 80 of the water component of any leachate solution, one or more pumps 24 are utilized to pump the defined leachate solution from the permitted lined or unlined holding area, which may just be in the hill, under some pressure from 26 to the formed conduit 12 and formed pipe 20 containing defined nozzles 12. More particularly, the one or more pumps pump the defined leachate or defined wastewater solution, in its natural untreated or perhaps partially treated state, into the formed pipe 20 where Liquid Particle Dispersion or Liquid Particle Conversion or Liquid Particle Release is initiated into the outlet end of the assembly 12. Once in the formed pipe 20, the defined leachate or defined wastewater solution under some water pressure is forced out the optimally spaced, configured, constructed and designed nozzles 18 into the path of a system of air to initiate Oxidative Diffusion or Oxidative Conversion or Oxidative Particle Release or Electrostatically Altered or commonly known as aerosolization out of the assembly 12. As noted above, as this system or stream of air exits the outward end of the assembly 12, the now aerosolized defined leachate or defined wastewater mixes with the directed air to form the Oxidatively Diffused air-untreated or partially treated leachate or air-untreated or partially treated wastewater solution mixture. The fluid and airflow pressure applied to the leachate upstream of the nozzles can vary widely depending on the type and consistency of the defined and regulated leachate or wastewater. In one example, the pressure is maintained between 10 psi and 200 psi depending on the desired flow rate and permitted throw distance and size of the equipment used. Further, the nozzles can be selected by a person of ordinary skill in the art to provide the degree of Aerial Dissemination or Oxidative Diffusion or aerosolization necessary or appropriate to optimize the efficiency of the process or method and still remain in compliance with all federal, state and local laws as well as client directed constraints.

As seen in FIG. 2, in one embodiment the assembly 12 is placed on a RCRA regulated site or landfill 50. From any point on that site, the assembly 12 can be moved and manipulated over time and distance to direct the air-untreated or partially treated leachate or air-untreated or partially treated wastewater mixture over substantially the entire upper surface 50 of the RCRA regulated site or landfill area. As noted above, in one example the throw of the aerosolization process or aerosolization method 70 may be as much as 300 meters and may be constrained by existing legal and permitting constraints. Thus, as illustrated in FIG. 2, a substantial portion of the aerially disseminated 70 or aerosolized leachate-water or wastewater solution entering the stream of air will effectively be Atmospherically Discharged 80 or aerosolized into the atmosphere above and around the RCRA regulated site or landfill 50. As much as 60-80 percent of the original untreated or partially treated leachate-water or wastewater solution can be Oxidatively Diffused and Atmospherically Discharged or commonly known as aerosolized 70 and 80 into the atmosphere. As also noted above, the defined leachate-water or wastewater solution will inherently include multiple regulated and defined contaminates to include suspended and possibly precipitated solids that will Oxidatively Diffuse out of the air stream within a shorter distance 70 as defined by legal and permitting guidelines and vary by each regulated and defined and permitted industry and site. Some industries and sites will choose to have a lined area for their defined collection area, some sites may not choose to have a lined area for oxidized and clumped contaminant collection. For example, some suspended and precipitated contaminating solids could be expected to aerially disseminate 70 in the area of 1 to 300 meters from the outlet end of the assembly 12. These suspended and precipitated contaminating solids can range from calcium and phosphorus compounds to other minerals, elements or compounds that might aid in the growth and proliferation of vegetation as seen in FIG. 2 just from the defined leachate or defined wastewater.

The airflow range of the assembly 12 can widely vary. It can vary widely based on active controls or it might vary widely based on environmental conditions, regulations or individual industry or site specifications or individual operator preference. As a general rule, the higher the pressure for a given nozzle, the greater the aerosolization 70 of the leachate or wastewater and the greater the aerosolization efficiency and water vapor component atmospheric disposal 80. Also, as a general rule, the larger the particle size and higher the particle weight the larger the nozzle size and specialized configuration 18.

Figure 4:
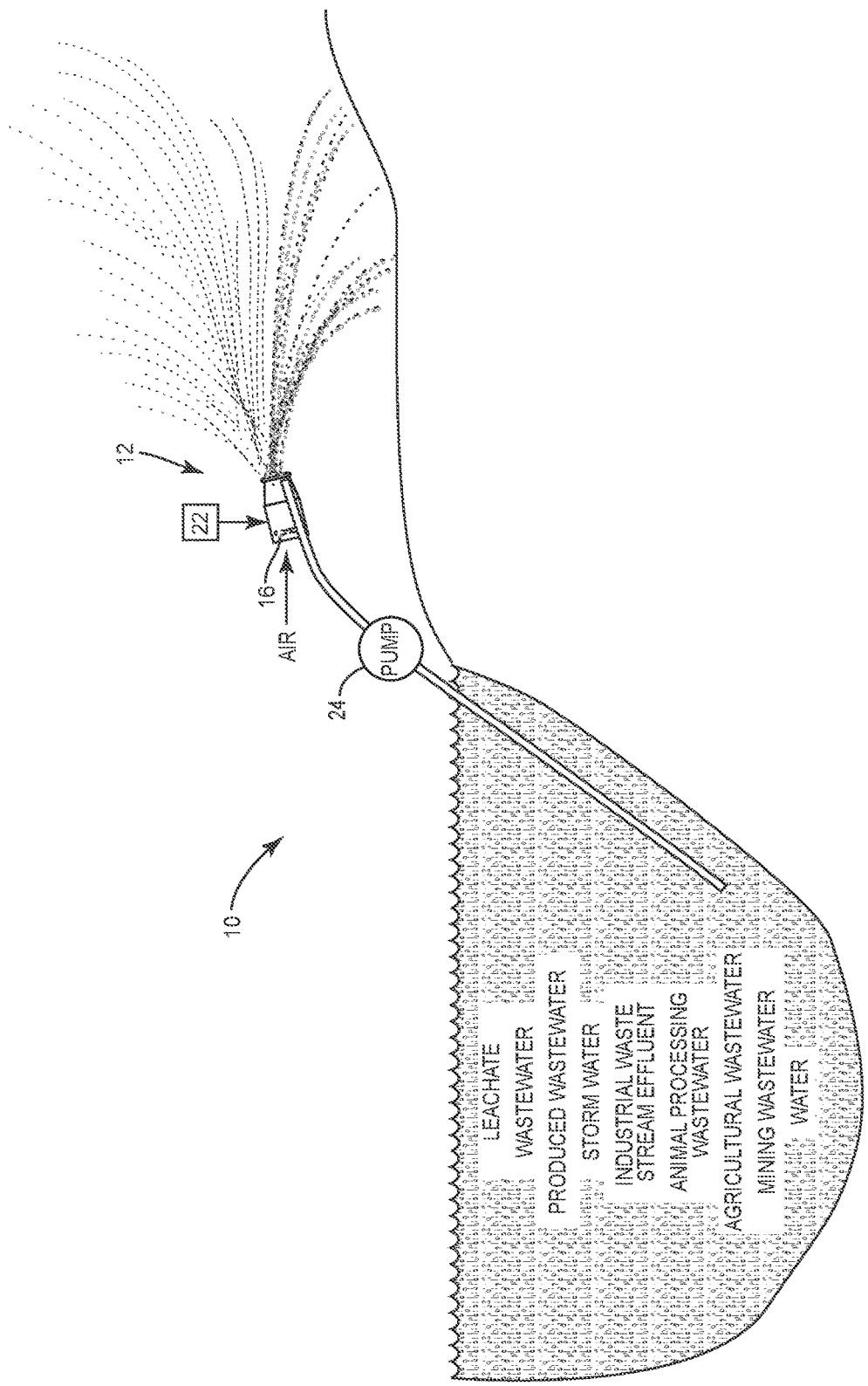
FIG. 4 is a schematic illustration similar to FIG. 2 showing a pump or series of pumps 24 providing a defined leachate or defined wastewater to a formed conduit 12 with formed pipe 20 containing defined nozzles 18 with the addition of a container 22 holding a beneficial aqueous solution or chosen industry and site specific Alternative Daily Cover (ADC) material. Beneficial aqueous solutions can be described as: odor control solutions, ground stabilizing or hardening solutions or vegetative enhancement solutions among many other solutions. Alternative Daily Cover (ADC) materials can be described as site and industry specific pre-approved materials that are used to cover daily industry specific operations. The addition of the container 22 of a beneficial aqueous solution or Alternative Daily Cover (ADC) material does not degraded the Oxidative Diffusion or Aerial Dissemination or "aerosolization" of the clumped contaminants 70 that are inherent in all defined leachates or defined wastewaters or may also be present in unregulated but utilizable on-site water. The application of the additional aqueous solution or Alternative Daily Cover (ADC) is shown as 40 and also containing the oxidized and clumped contaminants found in 70. The "fall out" of 40 and 70 does not degrade the Atmospheric Disposal 80 of the water component of the defined leachate or defined wastewater or on site water inherent in the inventive aerosolization method or process. Ease in the mobility of the entire system 12 is preferred but is not necessary.

As noted above, in one embodiment, the assembly 12 can be mounted on a mobile platform and can be moved from location to location about the RCRA regulated and defined leachate producing site or landfill or other defined wastewater producing site. This, again, enables the inherent suspended and perhaps precipitated contaminating solids contained in the leachate solution to be intentionally and uniformly aerially disseminated over the entire upper surface 50 of the defined leachate producing site or landfill or defined wastewater producing site. In addition, it may be advisable under certain permitted or regulated conditions to position the assembly 12 around the periphery of the RCRA regulated and defined leachate producing site or landfill or defined wastewater producing site. That is, a mobile platform could be positioned at various points around the periphery of the site with the outward end of the assembly 12 aimed up a slope as also found in FIG. 4. This may improve the retention of suspended and precipitated solids on the upper surface of the site and, depending on the composition and amount of liquid that actually Oxidatively Diffused 70 out of the air-leachate-water mixture, this can minimize "washing" and the formation of small gullies that run down the sides of the RCRA regulated or defined leachate producing site or defined wastewater producing site. FIG. 4 shows the beneficial uses of the system and method with regard to aqueous solutions or Alternative Daily Cover (ADC) solutions utilizing the same method or process 40 and additionally 70 while still providing the atmospheric disposal of the water component 80.

Figure 3:
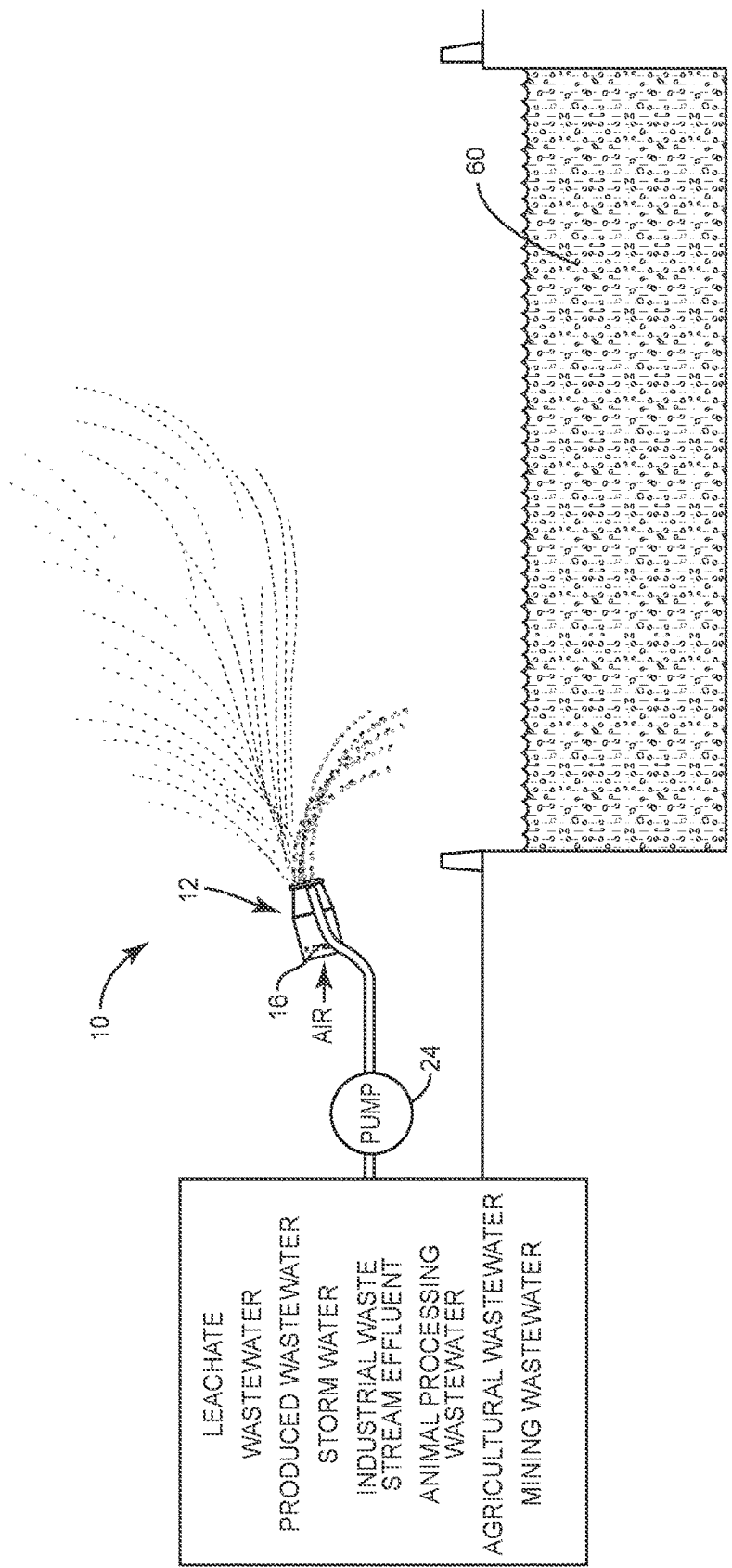
FIG. 3 is a schematic illustration showing the pumping 24 of a defined leachate or defined wastewater 60 back into the same lined or unlined catch basin or lagoon or defined collection area through a to a formed conduit 12 with a driven fan 16 with formed pipe 20 containing defined nozzles 18 in the Aerial Dissemination or Liquid-Water Particle Conversion or Oxidative Diffusion 70 or commonly known as an "aerosolization process" of the present invention being utilized to disseminate the oxidized and Electrostatically Altered or clumped particles of contamination of a defined leachate or defined wastewater 60 back into the originating unlined or lined catch basin or lagoon or defined collection area and finally disposing of the water component of the defined leachate or similarly defined wastewater as water vapor through known evaporation processes 80.

Turning to FIG. 3, there is shown an example of utilizing the assembly 12 of the present invention to aerially disseminate 70 and atmospherically dispose 80 of the water component of any regulated, defined multi-component leachate or defined wastewater on the site of its creation. In this case, the regulated and defined leachate or regulated and defined wastewater is contained within a lined or unlined catch basin or lagoon 60. The assembly 12 is positioned adjacent to an edge of the lined or unlined catch basin or lagoon 60. The defined leachate or defined wastewater contained in the catch basin or lagoon or defined collection area is directly pumped by one or more pumps 24 to the assembly 12 and more particularly to the formed pipe 20 and the defined nozzles 18 supported thereon. The defined leachate or defined wastewater, having many components, under some pressure, is forced out the defined nozzles 18 and directed inwardly and outwardly towards the passing air stream. This forms the aerial dissemination 70 or Oxidative Liquid Conversion 70 within the air-defined leachate or air-defined wastewater mixture and causes the "fallout" 70 found in the aerosolization process. The water component of the defined leachate or defined wastewater is thus liberated and starts the known evaporation process 80. The process of directly pumping from 60 to the formed pipe 20 continues until the defined leachate or defined wastewater is concentrated in the lined or unlined catch basin or lagoon or defined collection area to such a point that pumping is no longer desired or beneficial.

Turning to FIG. 4, there is shown an example of utilizing the assembly 12 of the present invention to aerially disseminate 70 and atmospherically dispose 80 of the water component of any defined leachate or defined wastewater as well as beneficially disseminate aqueous solutions 22 or industry specific and approved Alternative Daily Cover materials 22 to a desired location on a site 40. The outlet end of the assembly 12 is aimed over a chosen and defined collection area 40 and may go up slopes. Thus, the Aerially Disseminated or Oxidatively Converted or common vernacular "aerosolized" defined leachate or defined wastewater is the conveying medium of the aqueous solution or Alternative Daily Covering (ADC) solution shown as contained in 22. RCRA regulated and defined leachate producing sites and all other defined wastewater producing sites have a need to disseminate various beneficial aqueous solutions such as: odor controlling or soil stabilizing or solutions or materials beneficial to vegetative growth or in providing permit mandating Alternative Daily Cover (ADC) to their industry specific daily operations and the inventive process of leachate and wastewater aerosolization 70 and 80 additionally provides this beneficial aqueous solution or Alternative Daily Covering (ADC) material dissemination to a desired area 40 while still providing the purposes of oxidative clumping 70 and atmospheric disposal 80 of the water component of the conveying defined leachate or defined wastewater.

From the foregoing specification and discussion, it is seen that the process or method of the present invention is a; safe, effective, efficient and extremely economical way of aerially disseminating 70 and atmospherically disposing 80 or collectively understood "aerosolizing" the water component to all defined leachates and defined wastewaters on the site where they are generated while providing an additional conveyance method for beneficial aqueous solutions 70 and 40 or Alternative Daily Covering (ADC) materials 70 and 40. The invention is effective and efficient because substantial portions of the aqueous or liquid portions of the defined leachate or defined wastewater are effectively Aerially Disseminated or Oxidatively Diffused or Electrostatically Altered or commonly known as aerosolized into the atmosphere 70 and 80. Still, the method or process of the present invention safely and effectively clumps the suspended solids and particularly precipitated contaminating solid contaminants because their disposition in the Oxidative Diffusion 70 can be controlled and where regulated and defined and permitted site appropriate policies can be utilized in constructive and helpful ways such as in the case of RCRA regulated and defined leachate solutions or all other defined wastewaters where valuable minerals, elements or compounds are utilized as an effective fertilizer to promote the growth of onsite vegetation, which is also regulated and legally defined for each site 70 and 40.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed:

1. A method of disseminating and disposing of wastewater containing contaminating suspended solids by an aerosolization process, comprising:
   generating a system of air;
   pumping the wastewater and contaminating suspended solids to a series of nozzles configured and designed to enhance oxidation of the contaminating suspended solids emitted from the nozzles;
   emitting the wastewater and contaminating suspended solids from the nozzles and mixing the wastewater and contaminating suspended solids with the system of air to form an aerosolized wastewater-air mixture;
   propelling the aerosolized wastewater-air mixture through the atmosphere and over a defined solids collection area and as the contaminating suspended solids in the wastewater-air mixture move through the atmosphere, causing the oxidation of the contaminating suspended solids and causing the now oxidized contaminating suspended solids to become larger and heavier and forming irregular shapes and causing an increase of the electrostatic charges of the oxidized contaminating suspended solids which in turn cause the oxidized contaminating suspended solids to clump together and grow even larger and heavier and form additional irregular shapes;
   disseminating the oxidized contaminating suspended solids by directing the wastewater-air mixture over the solids collection area and causing the oxidized contaminating suspended solids to fall out of the wastewater-air mixture onto the solids collection area; and
   as the oxidized contaminating suspended solids fall out of the aerosolized wastewater-air mixture, disposing of a substantial portion of a water component of the wastewater through atmospheric dissemination and disposal and finally evaporation.

2. The method of claim 1 wherein the wastewater comprises produced water containing contaminating suspended solids and wherein the method forms an aerosolized produced water-air mixture that is propelled through the atmosphere and over the defined solids collection area and wherein the oxidized contaminating suspended solids from the aerosolized produced water-air mixture fall out of the produced water-air mixture onto the defined solids collection area.

3. The method of claim 1 wherein the wastewater comprises animal processing water containing contaminating suspended solids and wherein the method forms an aerosolized animal processing water-air mixture that is propelled through the atmosphere and over the defined solids collection area and wherein the oxidized contaminating suspended solids from the aerosolized animal processing water-air mixture fall out of the animal processing water-air mixture onto the defined solids collection area.

4. The method of claim 1 wherein the wastewater comprises stormwater containing contaminating suspended solids and wherein the method forms an aerosolized stormwater-air mixture that is propelled through the atmosphere and over the defined solids collection area and wherein the oxidized contaminating suspended solids from the aerosolized stormwater-air mixture fall out of the stormwater-air mixture onto the defined solids collection area.

5. The method of claim 1 wherein the wastewater comprises mining wastewater containing contaminating suspended solids and wherein the method forms an aerosolized mining wastewater-air mixture that is propelled through the atmosphere and over the defined solids collection area and wherein the oxidized contaminating suspended solids from the aerosolized mining wastewater-air mixture fall out of the mining wastewater-air mixture onto the defined solids collection area.

6. The method of claim 1 wherein the wastewater comprises agricultural wastewater containing contaminating suspended solids and wherein the method forms an aerosolized agricultural wastewater-air mixture that is propelled through the atmosphere and over the defined solids collection area and wherein the oxidized contaminating suspended solids from the aerosolized agricultural wastewater-air mixture fall out of the Agricultural wastewater-air mixture onto the defined solids collection area.

7. The method of claim 1 wherein the wastewater comprises freeboard water containing contaminating suspended solids and wherein the method forms an aerosolized freeboard water-air mixture that is propelled through the atmosphere and over the defined solids collection area and wherein the oxidized contaminating suspended solids from the aerosolized freeboard water-air mixture fall out of the freeboard water-air mixture onto the defined solids collection area.

8. The method of claim 1 wherein the defined wastewater comprises an aqueous solution also contaminating precipitated solids and wherein the method forms an aerosolized aqueous solution-air mixture that is propelled through the atmosphere and over the solids collection area and wherein aerially oxidized suspended and precipitated solids from the aerosolized aqueous solution-air mixture fall out of the aqueous solution-air mixture onto the solids collection area.

9. The method of claim 1 wherein the defined wastewater additionally comprises an alternative daily covering (ADC) solution and wherein the method forms an aerosolized alternative daily covering solution-air mixture that is propelled through the atmosphere and over the defined solids collection area.

10. The method of claim 1 wherein, prior to the wastewater being emitted from the nozzles, the method includes mixing an alternative daily covering with the wastewater and the suspended solids therein, and causing the alternative daily covering and the suspended solids within the wastewater to fall onto the solids collection area.

11. A method of disseminating and disposing of leachate containing contaminating suspended solids by an aerosolization process, comprising:
  generating a system of air;
  pumping the leachate and contaminating suspended solids to a series of nozzles configured and designed to enhance oxidation of the contaminating suspended solids emitted from the nozzles;
  emitting the leachate and contaminating suspended solids from the nozzles and mixing the leachate and contaminating suspended solids with the system of air to form an aerosolized leachate-air mixture;
  propelling the aerosolized leachate-air mixture through the atmosphere and over a defined solids collection area and as the contaminating suspended solids in the leachate-air mixture move through the atmosphere, causing the oxidation of the contaminating suspended solids and causing the now oxidized contaminating suspended solids to become larger and heavier and forming irregular shapes and causing an increase of the electrostatic charges of the oxidized contaminating suspended solids which in turn cause the oxidized contaminating suspended solids to clump together and grow even larger and heavier and form additional irregular shapes;
  disseminating the oxidized contaminating suspended solids by directing the leachate-air mixture over the solids collection area and causing the oxidized contaminating suspended solids to fall out of the leachate-air mixture onto the solids collection area; and
  as the oxidized contaminating suspended solids fall out of the aerosolized leachate-air mixture, disposing of a substantial portion of a water component of the leachate through atmospheric dissemination and disposal and finally evaporation.

12. The method of claim 11 wherein the defined leachate comprises an aqueous solution containing contaminating suspended solids and wherein the method forms an aerosolized aqueous solution-air mixture that is propelled through the atmosphere and over the defined solids and collection area and wherein aerially oxidized suspended solids from the aerosolized aqueous solution-air mixture fall out of the aqueous solution-air mixture onto a the solids collection area.

13. The method of claim 11 wherein the defined leachate additionally comprises an alternative daily covering (ADC) solution and wherein the method forms an aerosolized alternative daily covering-air mixture that is propelled through the atmosphere and over the solids collection area and wherein daily covering solid material forming a part of the ADC fall onto solids collection area.

14. The method of claim 11 wherein, prior to the leachate being emitted from the nozzles, the method includes mixing an alternative daily covering with the leachate and the suspended solids therein, and causing the alternative daily covering and the suspended solids within the leachate to fall onto the solids collection area.

15. A method of disseminating and disposing of waste stream effluent containing contaminating suspended solids by an aerosolization process, comprising:
  generating a system of air;
  pumping the waste stream effluent and contaminating suspended solids to a series of nozzles configured and designed to enhance oxidation of the contaminating suspended solids emitted from the nozzles;
  emitting the wastewater and contaminating suspended solids from the nozzles and mixing the waste stream effluent and contaminating suspended solids with the system of air to form an aerosolized waste stream effluent-air mixture;
  propelling the aerosolized waste stream effluent-air mixture through the atmosphere and over a defined solids collection area and as the contaminating suspended solids in the waste stream effluent-air mixture move through the atmosphere, causing the oxidation of the contaminating suspended solids and causing the now oxidized contaminating suspended solids to become larger and heavier and forming irregular shapes and causing an increase of the electrostatic charges of the oxidized contaminating suspended solids which in turn cause the oxidized contaminating suspended solids to clump together and grow even larger and heavier and form additional irregular shapes;
  disseminating the oxidized contaminating suspended solids by directing the waste stream effluent-air mixture over the solids collection area and causing the oxidized contaminating suspended solids to fall out of the waste stream effluent-air mixture onto the solids collection area; and
  as the oxidized contaminating suspended solids fall out of the aerosolized waste stream effluent-air mixture, disposing of a substantial portion of a water component of the waste stream effluent through atmospheric dissemination and disposal and finally evaporation.

16. The method of claim 15 wherein the waste stream effluent is an Industrial waste stream and comprises an aqueous solution containing contaminating suspended solids and wherein the method forms an aerosolized Industrial waste stream effluent-air mixture that is propelled through the atmosphere and over the solids collection area and wherein the oxidized suspended solids fall out of the industrial waste stream effluent-air mixture onto the solids collection area.

17. The method of claim 15 wherein the waste stream effluent further comprises an alternative daily covering solution that comprises daily covering solid material and wherein when the waste stream effluent-air mixture is propelled through the atmosphere and over the solids collection area, the daily covering material, along with suspended solids fall out of the waste stream effluent-air mixture onto the solids collection area.

18. The method of claim 15 wherein, prior to the waste stream effluent being emitted from the nozzles, the method includes mixing an alternative daily covering with the waste stream effluent and the suspended solids therein, and causing the alternative daily covering and the suspended solids in the waste stream effluent to fall onto the solids collection area.

* * * * *